(12) United States Patent
Li

(10) Patent No.: US 12,131,069 B2
(45) Date of Patent: *Oct. 29, 2024

(54) DATA READ-WRITE METHOD AND APPARATUS AND CIRCULAR QUEUE

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 27 days.

This patent is subject to a terminal disclaimer.

(21) Appl. No.: 18/046,364

(22) Filed: Oct. 13, 2022

(65) Prior Publication Data

US 2023/0054884 A1 Feb. 23, 2023

Related U.S. Application Data

(63) Continuation of application No. 17/103,143, filed on Nov. 24, 2020, now Pat. No. 11,500,586, which is a continuation of application No. PCT/CN2018/102757, filed on Aug. 28, 2018.

(30) Foreign Application Priority Data

May 28, 2018 (CN) .......................... 201810525547.1

(51) Int. Cl.
G06F 3/06 (2006.01)

(52) U.S. Cl.
CPC .......... G06F 3/0659 (2013.01); G06F 3/0604 (2013.01); G06F 3/0679 (2013.01)

(58) Field of Classification Search
CPC .... G06F 3/0659; G06F 3/0604; G06F 3/0679; G06F 9/544; G06F 9/546; G06F 9/5016; G06F 5/16
See application file for complete search history.

(56) References Cited

U.S. PATENT DOCUMENTS

| 6,145,061 | A | 11/2000 | Garcia et al. |
| 6,314,478 | B1 | 11/2001 | Etcheverry |
| 9,378,059 | B2 | 6/2016 | Huetter et al. |
| 2004/0228429 | A1* | 11/2004 | Schanke ................. H04L 25/14 375/372 |

(Continued)

FOREIGN PATENT DOCUMENTS

| CN | 105260153 A | 1/2016 |
| CN | 106658050 A | 5/2017 |

(Continued)

*Primary Examiner* — Khoa D Doan
*Assistant Examiner* — Tong B. Vo
(74) *Attorney, Agent, or Firm* — Frank Gao, Esq.

(57) ABSTRACT

The present invention provides a data read-write method and apparatus and a circular queue. The method includes: obtaining an offset position of a write pointer from a queue head of a circular queue; determining an offset position of a read pointer according to the offset position of the write pointer; and reading data from the circular queue according to the offset position of the read pointer. Single input multiple output of share memory is implemented, and therefore a plurality of read threads may read data from the circular queue in parallel, thereby effectively improving read-write efficiency of data, and reducing memory consumption.

20 Claims, 6 Drawing Sheets

(56) References Cited

U.S. PATENT DOCUMENTS

| | | | |
|---|---|---|---|
| 2005/0066080 A1* | 3/2005 | Duckman | H04L 67/1097 |
| | | | 710/52 |
| 2010/0030978 A1* | 2/2010 | Hada | G09G 5/42 |
| | | | 711/155 |
| 2013/0014118 A1 | 1/2013 | Jones | |
| 2014/0059317 A1* | 2/2014 | Okajima | G06F 12/02 |
| | | | 711/165 |
| 2014/0149694 A1* | 5/2014 | Lee | G06F 5/12 |
| | | | 711/159 |
| 2015/0254116 A1* | 9/2015 | Kim | G06F 9/544 |
| | | | 719/314 |
| 2016/0357481 A1* | 12/2016 | Nam | G06F 3/061 |
| 2017/0220390 A1* | 8/2017 | Jain | G06F 9/524 |
| 2017/0329574 A1* | 11/2017 | Pean | G06F 13/28 |
| 2018/0203666 A1* | 7/2018 | Okumura | G06F 5/14 |
| 2018/0293965 A1* | 10/2018 | Vembu | G06F 9/45533 |
| 2019/0042148 A1* | 2/2019 | Benisty | G06F 13/1673 |
| 2020/0301765 A1* | 9/2020 | Vary | G06F 9/52 |

FOREIGN PATENT DOCUMENTS

| | | |
|---|---|---|
| CN | 107247561 A | 10/2017 |
| CN | 107302531 A | 10/2017 |
| EP | 3786789 A1 | 3/2021 |

* cited by examiner

| Size | | | |
|---|---|---|---|
| Write_Pos | | | |
| Write_No | | | |
| Len | Pos1 | No1 | Frame data |
| Len | Pos2 | No2 | Frame data |
| Len | Pos3 | No3 | Frame data |
| Len | Pos4 | No4 | Frame data |
| Len | Pos5 | No5 | Frame data |
| Len | Pos6 | No6 | Frame data |
| Len | Pos7 | No7 | Frame data |
| Len | Pos8 | No8 | Frame data |

DATA READ-WRITE METHOD AND APPARATUS AND CIRCULAR QUEUE

The present application is a continuation of U.S. patent application Ser. No. 17/103,143 filed on Nov. 24, 2020, which is a continuation of International Application No. PCT/CN2018/102757, filed on Aug. 28, 2018, which claims priority of Chinese Patent Application No. 201810525547.1, filed on May 28, 2018, which is incorporated herein by reference in its entirely.

BACKGROUND

Technical Field

The present invention relates to the field of data storage technologies, and in particular, to a data read-write method and apparatus and a circular queue.

Related Art

A queue is a storage structure that can implement "first in first out (FIFO)". Queues are classified into a normal queue and a circular queue. The normal queue is generally composed by arrays, and data access is carried out in a FIFO processing manner. There is no circular structure in memory. Therefore, the circular queue is actually implemented by using a linear space of arrays.

The circular queue connects array elements q[0] and q[MAXN−1] logically, to form a circular space for storing the queue. To facilitate reading and writing, array subscripts such as head/tail further need to be used for indicating read and write positions of the queue. The head points to a readable position and the tail points to a writable position.

The circular queue improves access efficiency of data, but the existing circular queue can only support single input and single output of data. When there are a plurality of concurrent outputs, a plurality of circular queues need to be created, causing high memory consumption and low data transmission efficiency.

SUMMARY

The present invention provides a data read-write method and apparatus and a circular queue, to enable a plurality of read threads to read data from a circular queue at the same time, thereby effectively improving read-write efficiency of data, and reducing memory consumption.

According to a first aspect, an embodiment of the present invention provides a data read-write method, including:
 obtaining an offset position of a write pointer from a queue head of a circular queue;
 determining an offset position of a read pointer according to the offset position of the write pointer; and
 reading data from the circular queue according to the offset position of the read pointer.

Optionally, the obtaining the offset position of the write pointer from the queue head of a circular queue includes:
 obtaining, through at least two read threads, the offset position of the write pointer from the queue head of the circular queue.

Optionally, the at least two read threads belong to a process;
 each of the at least two read threads belongs to the process;
 each of the at least two read threads is run by a processor; or
 the at least two read threads are run by the processor.

Optionally, the determining the offset position of the read pointer according to the offset position of the write pointer includes:
 using the offset position of the write pointer as the offset position of the read pointer.

Optionally, the reading the data from the circular queue according to the offset position of the read pointer includes:
 finding a frame in the circular queue according to the offset position of the read pointer; and
 reading a frame header and frame data of the frame.

Optionally, after the reading the data from the circular queue, the method further includes:
 determining whether the offset position of the write pointer in the queue head of the circular queue is updated; and
 reading, if the offset position of the write pointer is updated, the data from the circular queue again according to the updated offset position of the write pointer.

Optionally, the determining whether the offset position of the write pointer in the queue head of the circular queue is updated includes:
 determining whether a frame number corresponding to the write pointer in the queue head of the circular queue is updated; and
 determining, if the frame number is updated, that the offset position of the write pointer is updated.

Optionally, the determining whether a frame number corresponding to the write pointer in the queue head of the circular queue is updated includes:
 updating a frame number corresponding to the read pointer;
 obtaining the frame number corresponding to the write pointer in the queue head of the circular queue;
 determining whether the updated frame number corresponding to the read pointer is less than the frame number corresponding to the write pointer; and
 determining, if the updated frame number corresponding to the read pointer is less than the frame number corresponding to the write pointer, that the frame number corresponding to the write pointer in the queue head of the circular queue is updated.

Optionally, the determining whether the offset position of the write pointer in the queue head of the circular queue is updated includes:
 obtaining the offset position of the write pointer from the queue head of the circular queue again;
 determining whether the offset position of the write pointer that is obtained again is the same as the offset position of the write pointer that is obtained previously; and
 determining, if the offset position of the write pointer that is obtained again is different from the offset position of the write pointer that is obtained previously, that the offset position of the write pointer in the queue head of the circular queue is updated.

According to a second aspect, an embodiment of the present invention provides a data read-write method, including:
 obtaining, when a frame of to-be-written data is obtained, an offset position of a write pointer from a queue head of a circular queue;
 writing the to-be-written data to the circular queue according to the offset position of the write pointer; and
 updating the offset position of the write pointer in the queue head.

Optionally, the method further includes:

determining whether the circular queue is full according to a size of the offset position of the write pointer and a size of the to-be-written data; and changing, if the circular queue is full, the offset position of the write pointer to a position at which a first storage space of the circular queue is located.

Optionally, the determining whether the circular queue is full according to the size of the offset position of the write pointer and the size of the to-be-written data includes:

determining whether a size sum of the offset position of the write pointer, and a frame header and frame data of a frame corresponding to the to-be-written data is greater than or equal to a total size of the circular queue; and determining, if the size sum is greater than or equal to the total size, that the circular queue is full.

Optionally, the writing the to-be-written data to the circular queue according to the offset position of the write pointer includes:

determining a frame of storage space in the circular queue according to the offset position of the write pointer; and writing related information of the to-be-written data to a frame header of the storage space, and writing the to-be-written data to frame data of the storage space;

the related information of the to-be-written data comprising a total length of a to-be-written data frame.

Optionally, after the writing the to-be-written data to the circular queue according to the offset position of the write pointer, the method further includes:

updating a frame number corresponding to the write pointer in the queue head.

According to a third aspect, an embodiment of the present invention provides a circular queue, including:

a queue head and a frame queue, where the queue head includes an offset position of a write pointer; and a frame of storage space in the frame queue includes a frame header and frame data.

Optionally, the queue head further includes a total size of the circular queue.

Optionally, the queue head further includes a frame number corresponding to the write pointer.

Optionally, the frame header includes a length of the frame data, a frame number corresponding to the frame data and an offset position.

According to a fourth aspect, an embodiment of the present invention provides a data read-write apparatus, including:

an obtaining module, configured to obtain an offset position of a write pointer from a queue head of a circular queue;

a determining module, configured to determine an offset position of a read pointer according to the offset position of the write pointer; and a reading module, configured to read data from the circular queue according to the offset position of the read pointer.

Optionally, the obtaining module is specifically configured to:

obtain, through at least two read threads, the offset position of the write pointer from the queue head of the circular queue.

Optionally, the at least two read threads belong to a process;

each of the at least two read threads belongs to the process;

each of the at least two read threads is run by a processor; or the at least two read threads are run by the processor.

Optionally, the determining module is specifically configured to:

use the offset position of the write pointer as the offset position of the read pointer.

Optionally, the reading module is specifically configured to:

find a frame in the circular queue according to the offset position of the read pointer; and read a frame header and frame data of the frame.

Optionally, the apparatus further includes:

a judgment module, configured to determine, after the data is read from the circular queue, whether the offset position of the write pointer in the queue head of the circular queue is updated; and read, if the offset position of the write pointer is updated, the data from the circular queue again according to the updated offset position of the write pointer.

Optionally, the determining whether the offset position of the write pointer in the queue head of the circular queue is updated includes:

determining whether a frame number corresponding to the write pointer in the queue head of the circular queue is updated; and determining, if the frame number is updated, that the offset position of the write pointer is updated.

Optionally, the determining whether a frame number corresponding to the write pointer in the queue head of the circular queue is updated includes:

updating a frame number corresponding to the read pointer;

obtaining the frame number corresponding to the write pointer in the queue head of the circular queue;

determining whether the updated frame number corresponding to the read pointer is less than the frame number corresponding to the write pointer; and determining, if the updated frame number corresponding to the read pointer is less than the frame number corresponding to the write pointer, that the frame number corresponding to the write pointer in the queue head of the circular queue is updated.

Optionally, the determining whether the offset position of the write pointer in the queue head of the circular queue is updated includes:

obtaining an offset position of the write pointer from the queue head of the circular queue again;

determining whether the offset position of the write pointer that is obtained again is the same as the offset position of the write pointer that is obtained previously; and determining, if the offset position of the write pointer that is obtained again is different from the offset position of the write pointer that is obtained previously, that the offset position of the write pointer in the queue head of the circular queue is updated.

According to a fifth aspect, an embodiment of the present invention provides a data read-write apparatus, including:

an obtaining module, configured to obtain, when a frame of to-be-written data is obtained, an offset position of a write pointer from a queue head of a circular queue;

a writing module, configured to write the to-be-written data to the circular queue according to the offset position of the write pointer; and an updating module, configured to update the offset position of the write pointer in the queue head.

Optionally, the apparatus further includes:

a judgment module, configured to determine whether the circular queue is full according to a size of the offset position of the write pointer and a size of the to-be-written data; and change, if the circular queue is full, the offset position of the write pointer to a position at which a first storage space of the circular queue is located.

Optionally, the determining whether the circular queue is full according to a size of the offset position of the write pointer and a size of the to-be-written data includes:

determining whether a size sum of the offset position of the write pointer and a frame header and frame data of a frame corresponding to the to-be-written data is greater than or equal to a total size of the circular queue; and determining, if the size sum is greater than or equal to the total size, that the circular queue is full.

Optionally, the writing module is specifically configured to:

determine a frame of storage space in the circular queue according to the offset position of the write pointer; and write related information of the to-be-written data to a frame header of the storage space, and write the to-be-written data to frame data of the storage space.

Optionally, the updating module is further configured to update, after the to-be-written data is written to the circular queue according to the offset position of the write pointer, a frame number corresponding to the write pointer in the queue head.

According to a sixth aspect, an embodiment of the present invention provides a data read-write apparatus, including:

a memory, configured to store read threads; and a processor coupled to the memory, configured to call the read threads stored in the memory, to implement the data read-write method according to the first aspect.

According to a seventh aspect, an embodiment of the present invention provides a data read-write apparatus, including:

a memory, configured to store write threads; and a processor coupled to the memory, configured to call the write threads stored in the memory, to implement the data read-write method according to the second aspect.

According to an eighth aspect, an embodiment of the present invention provides a computer-readable storage medium, including instructions that, when run on a computer, cause the computer to perform the method according to any of the first aspect and/or the second aspect.

According to the data read-write method and apparatus and the circular queue provided in the present invention, an offset position of a write pointer is obtained from a queue head of a circular queue; an offset position of a read pointer is determined according to the offset position of the write pointer; and data is read from the circular queue according to the offset position of the read pointer. Therefore, a plurality of read threads may read data from a circular queue in parallel, thereby effectively improving read-write efficiency of data, and reducing memory consumption.

BRIEF DESCRIPTION OF THE DRAWINGS

To describe the technical solutions in the embodiments of the present invention or in the prior art clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

Figure 1:
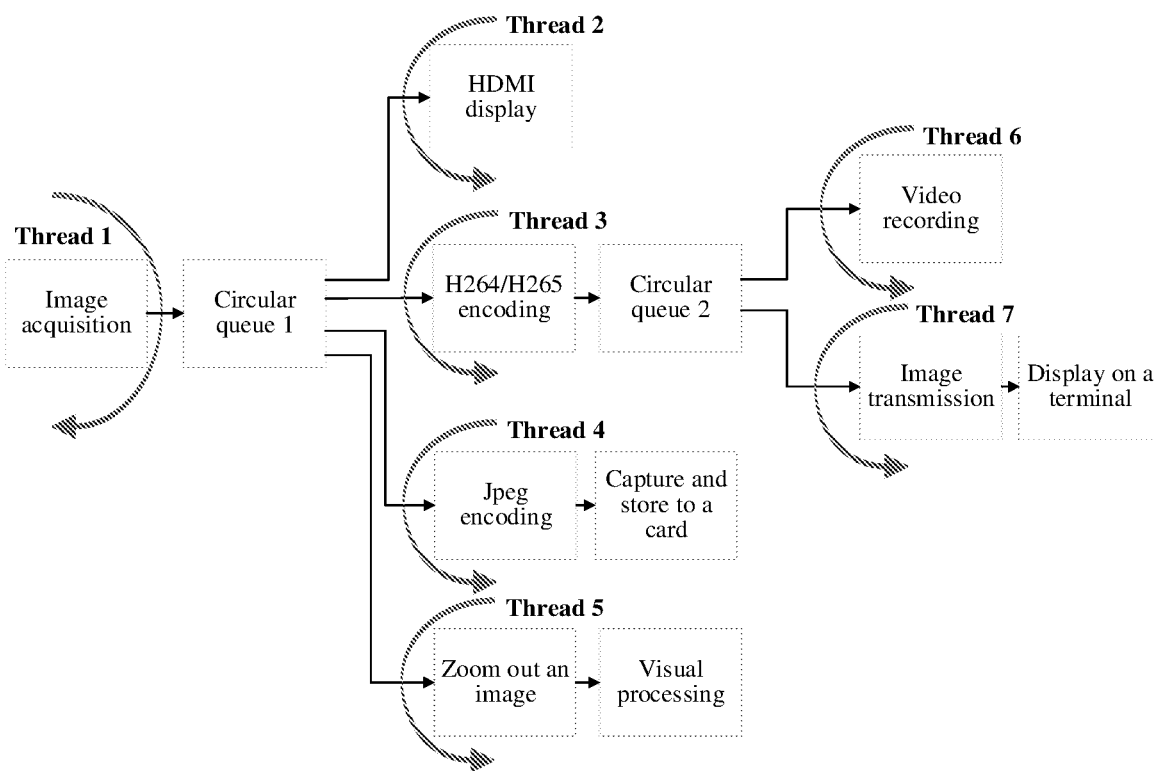
FIG. 1 is a schematic diagram of an application scenario of a circular queue according to the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present invention rather than all of the embodiments. All other embodiments obtained by persons of ordinary skill in the art based on the embodiments of the present invention without creative effects shall fall within the protection scope of the present invention.

In the specification, claims, and accompanying drawings of the present invention, the terms "first", "second", "third", "fourth", and so on (if existent) are intended to distinguish between similar objects rather than describe a specific order or sequence. It should be understood that the data used in such a way are interchangeable in proper circumstances so that the embodiments of the present invention described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

The following describes technical solutions of the present invention in detail with reference to specific embodiments. The following specific embodiments may be combined with each other, and the same or similar concepts or processes may not be repeated in some embodiments.

In the following, some terms in the present application are described, so as to help persons skilled in the art have a better understanding.

(1) A circular queue is a head-to-tail FIFO data structure implemented by using a linear space of arrays, and whether a queue state is full or empty can be determined quickly, so as to quickly access data. Principle of the circular queue: when data comes to a tail of the queue, the data goes back to a position 0 for processing. The going back is performed through a modulus operation. Therefore, the circular queue connects array elements q[0] and q[MAXN−1] logically, to form a circular space for storing the queue. To facilitate reading and writing, array subscripts such as head/tail further need to be used for indicating read and write positions of the queue. The head points to a readable position and the tail points to a writable position.

(2) A circular queue state is determined by defining a queue volume and a queue length in classes. When whether the queue is empty is determined, the queue is determined to be empty when the queue length is 0. When whether the queue is full is determined, the queue is determined to be full when the queue length is equal to the queue volume.

(3) Share memory is one of the simplest manners of communication between processes. Share memory allows two or more processes to access the same memory, just as a malloc( ) function returns a pointer pointing to the same physical memory region to different processes. If a process is writing data into a share memory region, other processes cannot perform read and write operations on the share memory region before the process finishes the operation.

The data read-write method provided in the embodiments of the present application is specific to a circular queue. The circular queue may be implemented by shared memory. In this case, the circular queue may be read and written by different threads of a process, or may be read and written by a plurality of processes, or even may be read and written by different processors or different chips.

An embodiment of the present application provides a circular queue, the circular queue having the following data structure. Through the following data structure, read and write operations may be performed on the circular queue at the same time, or data of the circular queue may be read by a plurality of read threads in parallel.

Figures 3, 4:
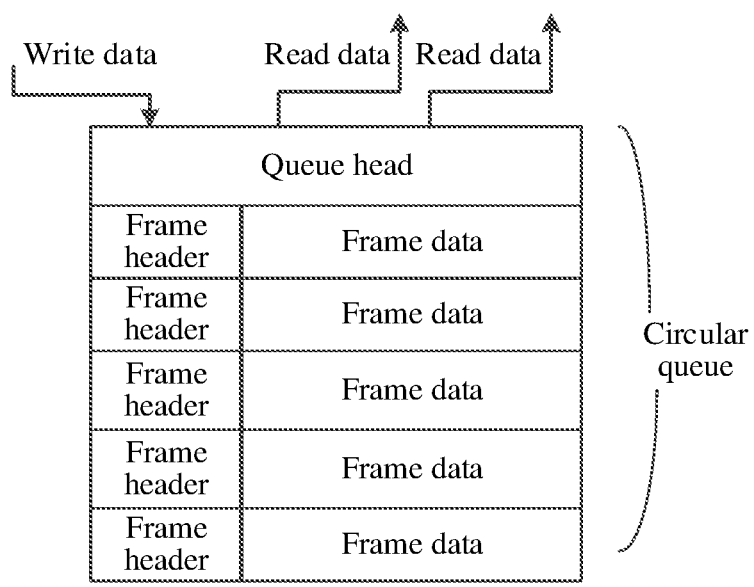
FIG. 3 is a schematic structural diagram of a circular queue.
FIG. 4 is a schematic diagram of an application scenario of reading and writing data in a circular queue.

FIG. 3 is a schematic structural diagram of a circular queue. FIG. 4 is a schematic diagram of an application scenario of reading and writing data in a circular queue. As shown in FIG. 3 or FIG. 4, the circular queue includes: a queue head and a frame queue, the queue head including an offset position of a write pointer. Further, the queue head may include a total size of the circular queue and a frame number corresponding to the write pointer. A storage space of the frame queue stores a frame header and frame data. The frame header may store a length of the frame data, a frame number corresponding to the frame data and an offset position. Each piece of frame data may be used for storing a frame of image data. The length of the frame data stored in the frame header may be understood as a size of the storage space of the frame data, or a data size of the image data stored in the frame data.

The offset position of the write pointer is a storage address of a frame in a frame queue to which the write pointer points. As shown in FIG. 3, POS1 to POS8 are used for representing storage addresses of frames. Correspondingly, the frame number corresponding to the write pointer is a frame number of the frame. As shown in FIG. 3, No1 to No8 are frame numbers of pieces of frame data. The frame numbers may be used for representing a time order of obtaining the pieces of frame data. The pieces of frame data successively obtained, for example, frames of image data successively obtained may be written to storage spaces corresponding to frame numbers in the frame queue in ascending order of the frame numbers. A frame of storage space corresponding to a frame number may be used for storing a frame of image data. When the write thread writes data to the last frame, for example, the frame No8 in FIG. 3, the write thread writes data starting from the frame No1 the next time the data is written. As shown in FIG. 3, Len may be used for representing a size of data stored in each frame, for example, a data length or a data size of image data stored in each frame. As shown in FIG. 3, the queue head of the circular queue stores a total volume value (size) of the circular queue, that is, a total size of the circular queue, an offset value (Write_Pos) of the write pointer, and a frame number (Write_No) corresponding to the write pointer.

Specifically, after writing the data to the frame queue, the write thread may update the offset position of the write pointer in the queue head and the frame number corresponding to the write pointer. The read thread may obtain the offset position of the write pointer from the queue head, so as to learn a storage address of the data. In this way, communication costs of the write thread and the read thread are reduced, and a plurality of read threads may be supported in reading data in parallel. Moreover, the offset position of the write pointer obtained by the read thread from the queue head is the storage address of the written data, which prevents the write thread and the read thread from operating the same storage space. Therefore, the storage space in the frame queue operated by the write thread is separated from the storage space in the frame queue operated by the read thread, thereby enabling the write thread and the read thread to operate a circular queue at the same time.

Specifically, the offset position of the write pointer may be obtained from the queue head of the circular queue, and then the offset position of the read pointer is determined according to the offset position of the write pointer. After the offset position of the read pointer is learned, data may be read from the circular queue. By adopting the foregoing circular queue structure, two or more read threads may be supported in reading data from the circular queue in parallel. Refer to the following embodiment for a specific implementation.

Herein, an embodiment of the present application provides a system to which the circular queue is applicable. The system may alternatively be understood as an application scenario. The system is used for transmitting and processing image data acquired by an image acquisition apparatus. For example, the system may be configured in an unmanned aerial vehicle (UAV).

FIG. 1 is a schematic diagram of an application scenario of a circular queue according to the present invention. As shown in FIG. 1, the application scenario is applicable to a UAV.

A thread 1 may be used as an image acquisition thread, to be performed by a processor in an image acquisition apparatus. The thread 1 may write acquired image data, for example, image data YUV420, to a circular queue 1. That is, relative to the circular queue 1, the thread 1 is a write thread. The circular queue 1 is based on the foregoing data structure. The circular queue 1 supports a thread 2 to a thread 5 in reading the circular queue 1 in parallel, and supports one or more of the thread 2 to the thread 5 in performing a read operation on the circular queue 1 when the thread 1 performs a write operation on the circular queue 1. That is, relative to the circular queue 1, the thread 2 to the thread 5 are read threads. The thread 2 is used for HDMI display, and the thread 3 is used for performing a first type of encoding, for example, H264/H265 encoding, on the read image data. The thread 4 is used for performing a second type of encoding, for example, Jpeg encoding, on the read data. After Jpeg encoding is performed on the image data, the encoded image data may be stored locally, for example, stored in a secure digital memory card (SD card) or a TranFlash card (TF card)

in the aerial vehicle. The thread 5 is used for processing the image data, for example, zooming out the image (for example, zooming out the image to a video graphics array (VGA) size). Visual processing or the like may be further performed on the processed image data, which is not limited herein.

Further, the thread 3 may write the encoded image data to the circular queue 2. That is, relative to the circular queue 2, the thread 3 is a write thread. The circular queue 2 is based on the foregoing data structure. The circular queue 2 supports a thread 6 and a thread 7 in reading the circular queue 2 in parallel, and supports the thread 6 and/or the thread 7 in performing a read operation on the circular queue 2 when the thread 3 performs a write operation on the circular queue 2. The thread 6 is used for video recoding, that is, taking out a plurality of frames of image data from the second circular queue for packaging in MP4 or MOV format, to obtain video data. The video data may be further stored in a memory, that is, implementing video recording. The thread 7 is used for transmitting image data, and the image data is transmitted to a terminal connected to the aerial vehicle to be displayed in real time or to be stored in the terminal.

A single input multiple output circular queue is adopted in FIG. 1, and memory consumption may be reduced in a scenario of a plurality of outputs. Transmission of big data of a code stream video image in this manner may improve processing efficiency and reduce transmission latency, and data read procedures are independent of each other and do not interfere with each other. For example, a video recording process is not affected when the image transmission is frozen. For example, ultra-low latency HDMI display is not affected at all by visual processing with particularly large CPU consumption and H264/H265 encoding. By adopting the memory management method provided in the present invention, single input multiple output of data is implemented, thereby effectively improving data transmission efficiency and reducing memory consumption.

Based on the described data structure of the circular queue and the foregoing application scenario, read and write manners for the foregoing circular queue are described below with reference to the accompanying drawings.

A manner of reading data in the circular queue provided in an embodiment of the present application is first described.

Figure 2:
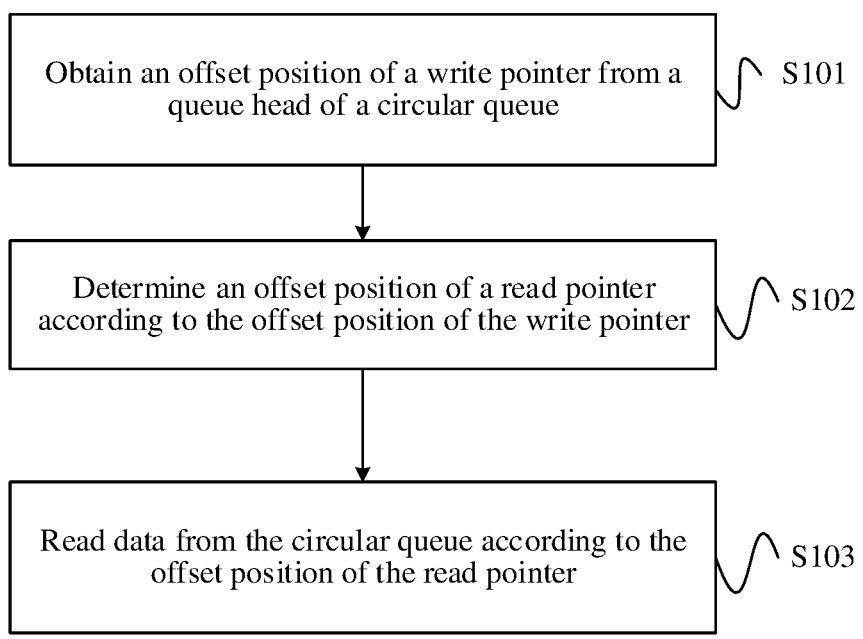
FIG. 2 is a flowchart of a data read-write method according to Embodiment 1 of the present invention.

FIG. 2 is a flowchart of a data read-write method according to Embodiment 1 of the present invention. As shown in FIG. 2, the method in this embodiment may include the following steps.

S101. Obtain an offset position of a write pointer from a queue head of a circular queue.

For example, when a read thread is performed by a processor, the offset position of the write pointer may be obtained from the queue head of the circular queue.

Specifically, the read thread may monitor whether the offset position of the write pointer in the queue head changes. A changed offset position indicates that there is new data written to the circular queue, and the obtaining the offset position of the write pointer is triggered. Alternatively, the read thread obtains the offset position of the write pointer from the queue head of the circular queue if data needs to be read.

Specifically, the read thread may obtain the offset position of the write pointer periodically, and determine whether there is new data written by comparing the offset positions of the write pointer and determining whether the offset positions are the same. Alternatively, under a trigger condition, the read thread obtains the offset position of the write pointer if a call instruction of another thread in the processor is received.

S102. Determine an offset position of a read pointer according to the offset position of the write pointer.

In this embodiment, the offset position of the write pointer in the queue head is obtained, and a position indicated by the read pointer, that is, the offset position of the read pointer, may be determined according to an offset value of the write pointer, that is, the offset position of the write pointer. Specifically, the offset position of the write pointer may be used as the offset position of the read pointer. It is assumed that a current offset value of the write pointer is Pos5. In this case, all the read threads may determine a position of currently-written data in the circular queue according to the offset value Pos5. Therefore, the read pointer may point to a position indicated by the offset value Pos5. After the position indicated by the read pointer is determined, the read threads may read data from the position indicated by the read pointer. It should be noted that, the read threads may be different processes, or may be threads from different processors or different chips. Read actions between read threads are independent of each other and do not interfere with each other.

S103. Read data from the circular queue according to the offset position of the read pointer.

In this embodiment, a frame in the circular queue may be found according to the offset position of the read pointer; and a frame header and frame data of the frame may be read.

Specifically, the read thread may read the frame header of the frame, and learn a frame number corresponding to the frame data and a length of the frame data. Further, an end point of the read data may be determined according to the length of the frame data.

Optionally, after the reading the data from the circular queue, the method further includes:
determining whether the offset position of the write pointer in the queue head of the circular queue is updated; and reading, if the offset position is updated, the data from the circular queue again according to the updated offset position of the write pointer.

In this embodiment, whether a frame number corresponding to the write pointer in the queue head of the circular queue is updated may be determined; and it is determined, if the frame number is updated, that the offset position of the write pointer is updated.

Further, the frame number corresponding to the write pointer in the queue head of the circular queue may be obtained by updating the frame number corresponding to the read pointer; whether an updated frame number corresponding to the read pointer is less than the frame number corresponding to the write pointer is determined; and it is determined, if the updated frame number corresponding to the read pointer is less than the frame number corresponding to the write pointer, that the frame number corresponding to the write pointer in the queue head of the circular queue is updated. Alternatively, an offset position of the write pointer may be obtained from the queue head of the circular queue again; whether the offset position of the write pointer that is obtained again is the same as the offset position of the write pointer that is obtained previously is determined; and it is determined, if the offset position of the write pointer that is obtained again is different from the offset position of the write pointer that is obtained previously, that the offset position of the write pointer in the queue head of the circular queue is updated.

Specifically, after the read thread reads a frame of data from the position indicated by the read pointer, a count value of a quantity of times of reading a data frame recorded in the read thread is updated. The count value may alternatively be understood as a frame number of the read pointer.

Specifically, the count value is self-increased by 1 after reading the data frame. Before obtaining a position of the read pointer of the circular queue, a written data number, that is, a frame number corresponding to the write pointer, in a current queue head is obtained first. Whether the count value is less than the written data number is determined. If the count value is greater than or equal to the written data number, it indicates that all the data previously written by the write thread has been read, and a written data number in the queue head is obtained again. If the count value is less than the written data number, a read pointer of the circular queue is obtained to continue to read data. The written data number is used for counting a quantity of times of writing a data frame to the circular queue; and after the write thread writes a data frame to the circular queue each time, the written data number is self-increased by 1.

In this embodiment, a quantity of times of reading the data frame by the read thread is counted by using the count value. In principle, a quantity of reading times of any read thread should be less than the written data number. Magnitudes of the count value and the written data number are first determined before obtaining the read pointer, which prevents, when a data writing operation is being performed on the circular queue, the read thread from performing a reading operation on a data frame being written.

According to this embodiment, an offset position of a write pointer is obtained from a queue head of a circular queue; an offset position of a read pointer is determined according to the offset position of the write pointer; and data is read from the circular queue according to the offset position of the read pointer. Therefore, a plurality of read threads may read data from a circular queue at the same time, thereby effectively improving read-write efficiency of data, and reducing memory consumption.

A manner of writing data to the circular queue provided in an embodiment of the present application is described below.

Figure 5:
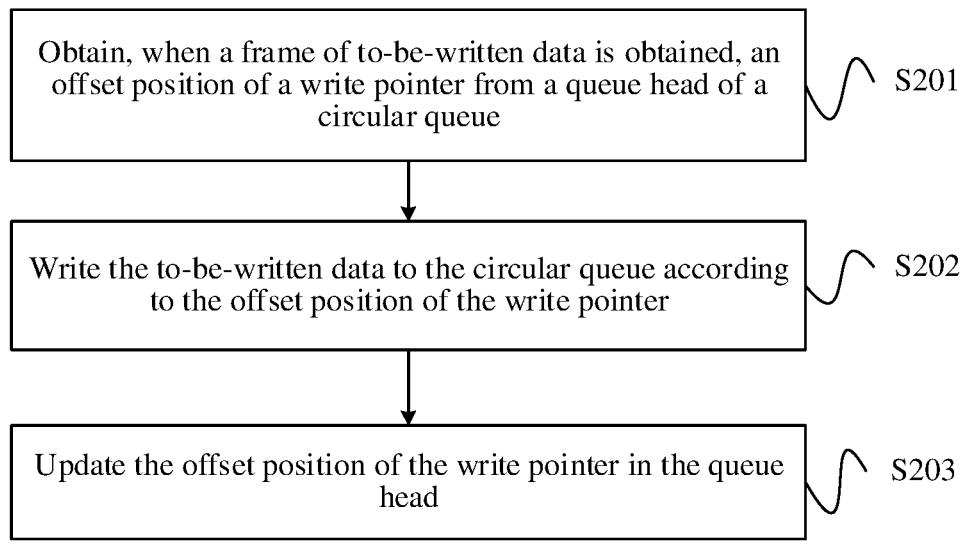
FIG. 5 is a flowchart of a data read-write method according to Embodiment 2 of the present invention.

FIG. 5 is a flowchart of a data read-write method according to Embodiment 2 of the present invention. As shown in FIG. 5, the method in this embodiment may include the following steps.

S201. Obtain, when a frame of to-be-written data is obtained, an offset position of a write pointer from a queue head of a circular queue.

In this embodiment, the offset value of the write pointer is obtained from the queue head of the circular queue, and the offset value of the write pointer indicates a storage region of the circular queue currently available for storage. In this embodiment, an order of writing data frames starts from a queue head side and the data frames are written according to storage regions of the circular queue in sequence. Therefore, frame numbers of the data frames are accumulated in sequence. For example, values of frame numbers No are 1, 2, 3 and the like in order.

S202. Write the to-be-written data to the circular queue according to the offset position of the write pointer.

In this embodiment, a frame of storage space in the circular queue may be determined according to the offset position of the write pointer. Related information of the to-be-written data is written to a frame header of the storage space, and the to-be-written data is written to frame data of the storage space. When the offset value of the write pointer is determined, a writing position of a current to-be-written data frame in the circular queue may be determined. The related information of the to-be-written data includes a total length of the to-be-written data frame, the total length of the to-be-written data frame being a sum of a frame header length and a frame data length of the to-be-written data frame, and the frame header length being a sum of a length of a space storing a frame number, a length of a space storing a frame length and a length of a space storing an offset value.

Optionally, the method further includes:

determining whether the circular queue is full according to a size of the offset position of the write pointer and a size of the to-be-written data; and changing, if the circular queue is full, the offset position of the write pointer to a position at which a first storage space of the circular queue is located.

In this embodiment, whether a size sum of the offset position of the write pointer and a frame header and frame data of a frame corresponding to the to-be-written data is greater than or equal to a size of the circular queue may be determined; and it is determined, if the size sum is greater than or equal to the size, that the circular queue is full.

Specifically, before the data frame is written, whether a sum of the offset value of the write pointer and the total length of the to-be-written data frame is less than a total volume value of the circular queue is determined first. Therefore, a storage state of the circular queue is learned, which avoids a situation that the written data frame overflows. When the sum of the offset value of the write pointer and the total length of the to-be-written data frame is greater than or equal to the total volume value of the circular queue, it indicates that the circular queue is in a full state. If a data frame is written, the data frame overflows. When the sum of the offset value of the write pointer and the total length of the to-be-written data frame is less than the total volume value of the circular queue, it indicates that the circular queue is not full, and data frames can be written normally.

In this embodiment, when the sum of the offset value of the write pointer and the total length of the to-be-written data frame is greater than or equal to the total volume value of the circular queue, the offset value of the write pointer is changed to a queue head length. In this case, data frames stored in the circular queue are cleared, and to-be-written data frames are written starting from a storage region on a side of the queue head in sequence. When the sum of the offset value of the write pointer and the total length of the to-be-written data frame is less than the total volume value of the circular queue, the to-be-written data frame is written to a writing position in the circular queue according to the writing position indicated by the offset value of the write pointer.

S203. Update the offset position of the write pointer in the queue head.

In this embodiment, when the sum of the offset value of the write pointer and the total length of the to-be-written data frame is greater than or equal to the total volume value of the circular queue, the offset value of the write pointer is changed to a queue head length. In this case, data frames stored in the circular queue are cleared, and to-be-written data frames are written starting from a storage region on a side of the queue head in sequence. When the sum of the offset value of the write pointer and the total length of the to-be-written data frame is less than the total volume value of the circular queue, the to-be-written data frame is written to a writing position in the circular queue according to the writing position indicated by the offset value of the write pointer.

In this embodiment, after a writing operation of the data frame is completed, the offset value of the write pointer in the queue head needs to be updated. Optionally, the offset value of the write pointer in the queue head may be changed to a sum of an offset value of a write pointer corresponding to previous data writing and a total length of a current to-be-written data frame. A written data number in the queue head is updated. Specifically, after the data frame is written, the written data number, that is, a frame number of the write pointer is self-increased by 1.

According to this embodiment, when a frame of to-be-written data is obtained, an offset position of a write pointer is obtained from a queue head of a circular queue; the to-be-written data is written to the circular queue according to the offset position of the write pointer; and the offset position of the write pointer in the queue head is updated. Therefore, a plurality of read threads may read data from a circular queue at the same time, thereby effectively improving read-write efficiency of data, and reducing memory consumption.

Figure 6:
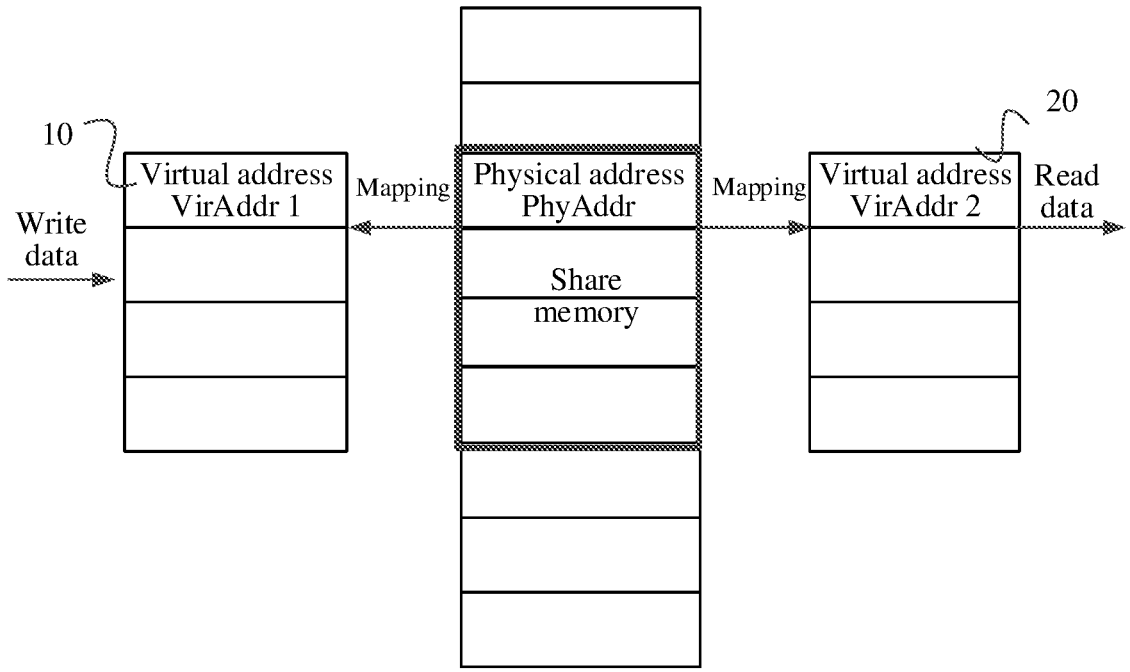
FIG. 6 is a schematic diagram of a data transmission principle between different processors.

FIG. 6 is a schematic diagram of a data transmission principle between different processors. As shown in FIG. 6, a continuous region with a size of "Size" at an initial physical address PhyAddr of a double data rate synchronous dynamic random access memory (DDR) serves as share memory, and the share region forms a circular queue. A first processor 10 obtains a corresponding virtual address VirAddr1 through mapping, and a region with a size of "Size" starting from the VirAddr1 may be understood as the foregoing circular queue. A write thread may perform an operation of writing data to the circular queue. A second processor 20 obtains a different virtual address VirAddr2 through mapping, and a region with a size of "Size" starting from the VirAddr2 may be understood as the foregoing circular queue. A read thread may perform an operation of reading data from the circular queue. The first processor 10 and the second processor 20 may transmit data to each other through the share memory, and the processors can write and read data without notifying each other with messages. Similarly, provided that different processes or even different chips use the same physical DDR, the technical solution shown in FIG. 6 can be adopted to transmit data efficiently. The circular queue is created based on the share memory. Therefore, not only data transmission of a plurality of threads can be implemented, but also big data transmission of a plurality of processes, a plurality of CPU processors, or a plurality of chips can be implemented.

The first processor 10 that is shown in FIG. 6 and that obtains the corresponding virtual address VirAddr1 through mapping may perform the technical solution shown in FIG. 4. The second processor 20 that is shown in FIG. 6 and that obtains the corresponding virtual address VirAddr2 through mapping may perform the technical solution shown in FIG. 2. For details of an implementation process and a technical principle, reference is made to related descriptions in FIG. 2 and FIG. 5, and details are not described herein again.

Figure 7:
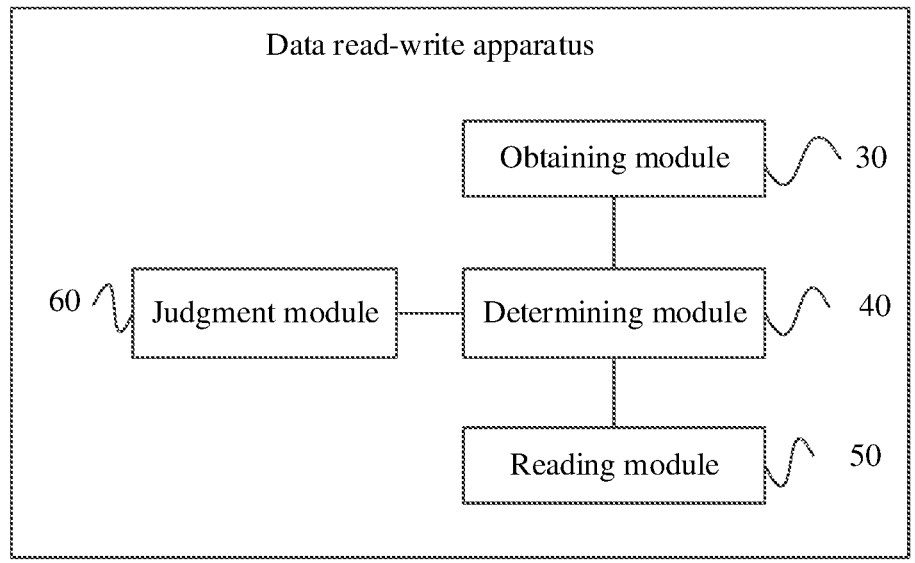
FIG. 7 is a schematic structural diagram of a data read-write apparatus according to Embodiment 3 of the present invention.

FIG. 7 is a schematic structural diagram of a data read-write apparatus according to Embodiment 3 of the present invention. As shown in FIG. 7, the apparatus in this embodiment may include:

an obtaining module 30, configured to obtain an offset position of a write pointer from a queue head of a circular queue;

a determining module 40, configured to determine an offset position of a read pointer according to the offset position of the write pointer; and a reading module 50, configured to read data from the circular queue according to the offset position of the read pointer.

Optionally, the obtaining module 30 is specifically configured to:

obtain, through at least two read threads, the offset position of the write pointer from the queue head of the circular queue.

Optionally, the at least two read threads belong to a process;

each of the at least two read threads belongs to the process;

each of the at least two read threads is run by a processor; or the at least two read threads are run by the processor.

Optionally, the determining module 40 is specifically configured to:

use the offset position of the write pointer as the offset position of the read pointer.

Optionally, the reading module 50 is specifically configured to:

find a frame in the circular queue according to the offset position of the read pointer; and read a frame header and frame data of the frame.

Optionally, the apparatus further includes:

a judgment module 60, configured to determine, after the data is read from the circular queue, whether the offset position of the write pointer in the queue head of the circular queue is updated; and read, if the offset position of the whiter pointer is updated, the data from the circular queue again according to an updated offset position of the write pointer.

Optionally, the determining whether the offset position of the write pointer in the queue head of the circular queue is updated includes:

determining whether a frame number corresponding to the write pointer in the queue head of the circular queue is updated; and determining, if the frame number is updated, that the offset position of the write pointer is updated.

Optionally, the determining whether a frame number corresponding to the write pointer in the queue head of the circular queue is updated includes:

updating a frame number corresponding to the read pointer;

obtaining the frame number corresponding to the write pointer in the queue head of the circular queue;

determining whether an updated frame number corresponding to the read pointer is less than the frame number corresponding to the write pointer; and determining, if the updated frame number corresponding to the read pointer is less than the frame number corresponding to the write pointer, that the frame number corresponding to the write pointer in the queue head of the circular queue is updated.

Optionally, the determining whether the offset position of the write pointer in the queue head of the circular queue is updated includes:

obtaining an offset position of the write pointer from the queue head of the circular queue again;

determining whether the offset position of the write pointer that is obtained again is the same as the offset position of the write pointer that is obtained previously; and determining, if the offset position of the write pointer that is obtained again is different from the offset position of the write pointer that is obtained previously, that the offset position of the write pointer in the queue head of the circular queue is updated.

In this embodiment, the technical solution in the method shown in FIG. 2 may be implemented, and an implementation process and a technical effect thereof are similar to those of the above method. Details are not described herein again.

Figure 8:
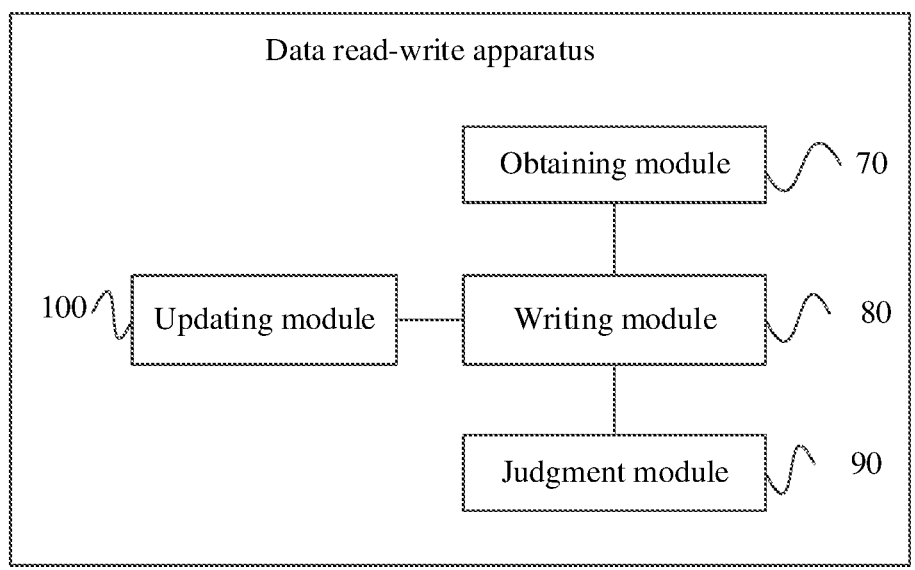
FIG. 8 is a schematic structural diagram of a data read-write apparatus according to Embodiment 4 of the present invention.

FIG. 8 is a schematic structural diagram of a data read-write apparatus according to Embodiment 4 of the present invention. As shown in FIG. 8, the apparatus in this embodiment may include:

an obtaining module 70, configured to obtain, when a frame of to-be-written data is obtained, an offset position of a write pointer from a queue head of a circular queue;

a writing module 80, configured to write the to-be-written data to the circular queue according to the offset position of the write pointer; and an updating module 90, configured to update the offset position of the write pointer in the queue head.

Optionally, the apparatus further includes:

a judgment module 100, configured to determine whether the circular queue is full according to a size of the offset position of the write pointer and a size of the to-be-written data; and change, if the circular queue is full, the offset position of the write pointer to a position at which a first storage space of the circular queue is located.

Optionally, the determining whether the circular queue is full according to the size of the offset position of the write pointer and the size of the to-be-written data includes:

determining whether a size sum of the offset position of the write pointer and a frame header and frame data of a frame corresponding to the to-be-written data is greater than or equal to a total size of the circular queue; and determining, if the size sum is greater than or equal to the total size, that the circular queue is full.

Optionally, the writing module 80 is specifically configured to:

determine a frame of storage space in the circular queue according to the offset position of the write pointer; and write related information of the to-be-written data to a frame header of the storage space, and write the to-be-written data to frame data of the storage space.

Optionally, the updating module 90 is further configured to update, after the to-be-written data is written to the circular queue according to the offset position of the write pointer, a frame number corresponding to the write pointer in the queue head.

In this embodiment, the technical solution in the method shown in FIG. 5 may be implemented, and an implementation process and a technical effect thereof are similar to those of the above method. Details are not described herein again.

An embodiment of the present invention further provides a circular queue, including:

a queue head and a frame queue, where the queue head includes an offset position of a write pointer; and a frame of storage space in the frame queue includes a frame header and frame data.

Optionally, the queue head further includes a total size of the circular queue.

Optionally, the queue head further includes a frame number corresponding to the write pointer.

Optionally, the frame header includes a length of the frame data, a frame number corresponding to the frame data and an offset position. The circular queue is used for performing the technical solutions shown in FIG. 2 and FIG. 5.

In this embodiment, the technical solutions in the methods shown in FIG. 2 and FIG. 5 may be performed, and an implementation process and a technical effect thereof are similar to those of the above method. Details are not described herein again.

An embodiment of the present invention further provides data structure applicable to a circular buffer, including:

a queue head and a frame queue, where the queue head includes size information of the circular buffer, an offset position of a write pointer, and a frame number corresponding to the write pointer; and each frame in the frame queue includes a frame header and frame data; and the frame header includes a length of the frame data, an offset position of the frame in the frame queue, and a number of the frame.

In this embodiment, the technical solutions in the methods shown in FIG. 2 and FIG. 5 may be performed, and an implementation process and a technical effect thereof are similar to those of the above method. Details are not described herein again.

Figure 9:
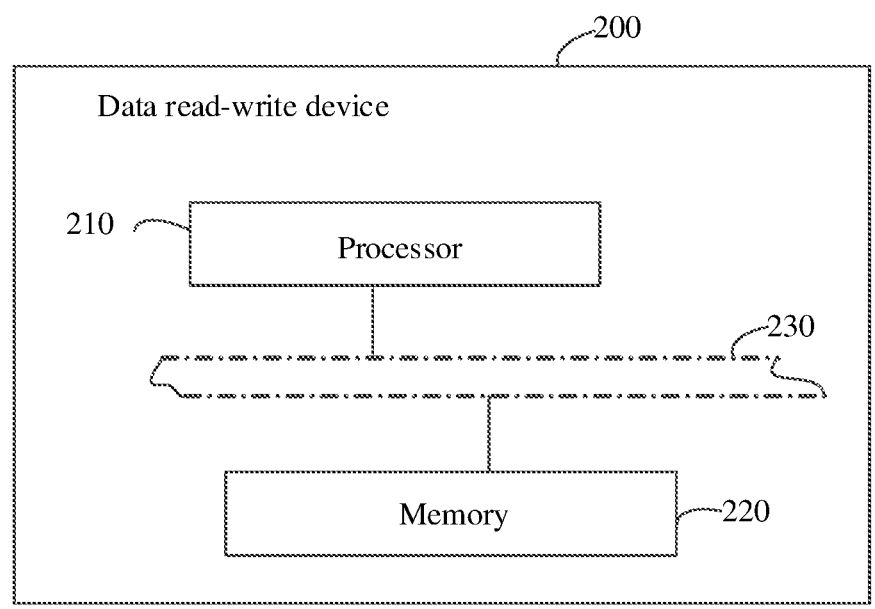
FIG. 9 is a schematic structural diagram of a data read-write device according to Embodiment 5 of the present invention.

FIG. 9 is a schematic structural diagram of a data read-write device according to Embodiment 5 of the present invention. As shown in FIG. 9, the data read-write device 200 in this embodiment includes:

a processor 210 and a memory 220, where the memory 220 is configured to store a computer program (for example, an application program and a thread program, such as a read thread or a write thread and a functional module, that implement the foregoing data reading and writing), a computer instruction, data, and the like. The computer program, the computer instruction, the data, and the like may be partitioned and stored in one or more memories 220. Moreover, the computer program, the computer instruction, the data, and the like may be called by the processor 210.

The memory 220 may include a volatile memory, such as a random access memory (RAM), a static random access memory (SRAM), and a double data rate synchronous dynamic random access memory (DDR SDRAM). The memory may also include a non-volatile memory, such as a flash memory, a hard disk drive (HDD), or a solid-state drive (SSD). The memory 220 may also include a combination of the foregoing types of memories.

The memory 220 may be further configured to store the data structure, the read thread, and the write thread of the foregoing circular queue, to implement the foregoing circular queue and the foregoing data read-write method. Certainly, the circular queue may alternatively be stored in another storage space, which is not limited herein.

The processor 210 is configured to perform the thread program or the computer program or the instruction stored in the memory, and call the read thread and the write thread stored in the memory 220 to implement the steps of the method in the foregoing embodiment. For details, refer to related descriptions in the foregoing method embodiment.

The processor 210 may be one of or a combination of dedicated processors, such as a central processing unit (CPU), a network processor (NP), a data processor, an image processor, and a task processor.

The processor 210 may further include a hardware chip. The hardware chip may be an application-specific integrated circuit (ASIC), a programmable logic device (PLD), or a combination thereof. The PLD may be a complex programmable logical device (CPLD), a field-programmable gate array (FPGA), a generic array logic (GA), or any combination thereof. Certainly, the processor may further include a single-chip microcomputer and other hardware apparatuses.

Optionally, the memory 220 may be independent or integrated with the processor 210.

When the memory 220 is a device independent of the processor 210, the memory management device 200 may further include:

a bus 230, configured to connect the memory 220 to the processor 210.

In addition, an embodiment of the present application further provides a computer-readable storage medium, the computer-readable storage medium storing computer-executable instructions, and the computer-executable instructions, when executed by at least one processor, performing the foregoing various possible methods.

The computer-readable medium includes a computer storage medium and a communication medium, where the communication medium includes any medium that enables a computer program to be transmitted from one place to another. The storage medium may be any available medium accessible to a general-purpose or dedicated computer. For example, a storage medium is coupled to a processor, so that the processor can read information from the storage medium or write information to the storage medium. Certainly, the storage medium may be a component of the processor. The processor and the storage medium may be located in an ASIC. In addition, the ASIC may be located in the user equipment. Certainly, the processor and the storage medium may be used as discrete assemblies existing in a communication device.

Persons of ordinary skill in the art may understand that all or some of the steps of the method embodiments may be implemented by a program instructing relevant hardware. The foregoing program may be stored in a computer-readable storage medium. When the program is run, the steps of the method embodiments are performed. The foregoing storage medium includes any medium that can store program code, such as a ROM, a RAM, a magnetic disk, or an optical disc.

Finally, it is to be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without making the essence of the corresponding technical solutions departing from the scope of the technical solutions of the embodiments of the present invention.

What is claimed is:

1. A data read-write method, comprising:
obtaining, an offset position of a write pointer, from a queue head of a circular queue;
determining an offset position of a read pointer according to the offset position of the write pointer; and
obtaining, a second offset position of a write pointer, from a queue head of a circular queue again after reading data from the circular queue according to the offset position of the read pointer;
reading, in response to the second offset position of the write pointer is different from the offset position of the write pointer that is obtained previously, the data from the circular queue again according to an updated offset position of the write pointer.

2. The method according to claim 1, wherein the obtaining, the offset position of the write pointer, from a queue head of a circular queue comprises:
obtaining, through at least two read threads, the offset position of the write pointer from the queue head of the circular queue;
the at least two read threads belong to a process;
each of the at least two read threads belong to a process;
each of the at least two read threads are performed by the processor.

3. The method according to claim 1, wherein after the reading data from the circular queue, the method further comprises:
determining whether the offset position of the write pointer in the queue head of the circular queue is updated; and
reading, in response to the offset position of the write pointer being updated, data from the circular queue again according to the updated offset position of the write pointer.

4. The method according to claim 3, wherein the determining whether the offset position of the write pointer in the queue head of the circular queue is updated comprises:
determining whether a frame number corresponding to the write pointer in the queue head of the circular queue is updated; and
determining, in response to the frame number is updated, that the offset position of the write pointer is updated.

5. The method according to claim 4, wherein the determining whether a frame number corresponding to the write pointer in the queue head of the circular queue is updated comprises:
updating a frame number corresponding to the read pointer;
obtaining the frame number corresponding to the write pointer in the queue head of the circular queue;
determining whether an updated frame number corresponding to the read pointer is less than the frame number corresponding to the write pointer; and
determining, in response to the updated frame number corresponding to the read pointer is less than the frame number corresponding to the write pointer, that the frame number corresponding to the write pointer in the queue head of the circular queue is updated.

6. The method according to claim 5, wherein the determining whether the offset position of the write pointer in the queue head of the circular queue is updated comprises:
determining whether the offset position of the write pointer that is obtained again is the same as the offset position of the write pointer that is obtained previously; and
determining, in response to the offset position of the write pointer that is obtained again is different from the offset position of the write pointer that is obtained previously, that the offset position of the write pointer in the queue head of the circular queue is updated.

7. A data read-write method, comprising:
obtaining, in response a frame of to-be-written data is obtained, an offset position of a write pointer, from a queue head of a circular queue;
changing the offset position of the write pointer to a position at which a first storage space of the circular queue is located in response to a size sum of the offset position of the write pointer and a frame header and frame data of a frame corresponding to the to-be-written data is greater than or equal to a total size of the circular queue;

writing the to-be-written data to the circular queue according to the changed offset position of the write pointer; and updating the offset position of the write pointer in the queue head.

8. The method according to claim 7, wherein the method further comprises:

writing the to-be-written data to the circular queue according to the offset position of the write pointer in response to the size sum of the offset position of the write pointer and the frame header and frame data of the frame corresponding to the to-be-written data is less than the total size of the circular queue.

9. The method according to claim 8, wherein the determining whether the circular queue is full according to a size of the offset position of the write pointer and a size of the to-be-written data comprises:

determining whether a size sum of the offset position of the write pointer and a frame header and frame data of a frame corresponding to the to-be-written data is greater than or equal to a total size of the circular queue;

determining, in response to the size sum is greater than or equal to the total size, that the circular queue is full; and determining, in response to the size sum is less than the total size, that the circular queue is not full.

10. The method according to claim 7, wherein the writing the to-be-written data to the circular queue according to the offset position of the write pointer comprises:

determining a frame of storage space in the circular queue according to the offset position of the write pointer; and writing related information of the to-be-written data to a frame header of the storage space, and writing the to-be-written data to frame data of the storage space;

the related information of the to-be-written data comprising a total length of a to-be-written data frame.

11. The method according to claim 7, wherein after the writing the to-be-written data to the circular queue according to the offset position of the write pointer, the method further comprises:

updating a frame number corresponding to the write pointer in the queue head.

12. A data reading apparatus, comprising:

a memory, configured to store read threads; and a processor coupled to the memory, configured to call the read threads stored in the memory, to perform the following operations:

obtaining, an offset position of a write pointer from a queue head of a circular queue;

determining an offset position of a read pointer according to the offset position of the write pointer; and obtaining, a second offset position of a write pointer, from a queue head of a circular queue again after reading data from the circular queue according to the offset position of the read pointer;

reading, when the second offset position of the write pointer that is obtained again is different from the offset position of the write pointer that is obtained previously, the data from the circular queue again according to an updated offset position of the write pointer.

13. The apparatus according to claim 12, wherein the processor is further configured to:

obtain, through at least two read threads, the offset position of the write pointer from the queue head of the circular queue;

the at least two read threads belong to a process;

each of the at least two read threads belong to a process;

perform each of the at least two read threads.

14. The apparatus according to claim 12, wherein the processor is further configured to:

determine whether the offset position of the write pointer in the queue head of the circular queue is updated; and read, in response to the offset position of write pointer being updated, data from the circular queue again according to the updated offset position of the write pointer.

15. The apparatus according to claim 14, wherein the processor is further configured to:

determine whether a frame number corresponding to the write pointer in the queue head of the circular queue is updated; and determine, in response to the frame number is updated, that the offset position of the write pointer is updated.

16. The apparatus according to claim 15, wherein the processor is further configured to:

update a frame number corresponding to the read pointer;

obtain the frame number corresponding to the write pointer in the queue head of the circular queue;

determine whether an updated frame number corresponding to the read pointer is less than the frame number corresponding to the write pointer; and determine, in response to the updated frame number corresponding to the read pointer is less than the frame number corresponding to the write pointer, that the frame number corresponding to the write pointer in the queue head of the circular queue is updated.

17. The apparatus according to claim 16, wherein the processor is further configured to:

determine whether the offset position of the write pointer that is obtained again is the same as the offset position of the write pointer that is obtained previously; and determine, in response to the offset position of the write pointer that is obtained again is different from the offset position of the write pointer that is obtained previously, that the offset position of the write pointer in the queue head of the circular queue is updated.

18. A data writing apparatus, comprising:

a memory, configured to store write threads; and a processor coupled to the memory, configured to call the write threads stored in the memory, to perform the following operations:

obtaining, when a frame of to-be-written data is obtained, an offset position of a write pointer, from a queue head of a circular queue;

changing the offset position of the write pointer to a position at which a first storage space of the circular queue is located when a size sum of the offset position of the write pointer and a frame header and frame data of a frame corresponding to the to-be-written data is greater than or equal to a total size of the circular queue;

writing the to-be-written data to the circular queue according to the changed offset position of the write pointer;

updating the offset position of the write pointer in the queue head.

19. The apparatus according to claim 18, wherein the processor is further configured to:

write the to-be-written data to the circular queue according to the offset position of the write pointer when the size sum of the offset position of the write pointer and the frame header and frame data of the frame corresponding to the to-be-written data is less than the total size of the circular queue.

20. The apparatus according to claim 19, wherein the processor is further configured to:

determine whether a size sum of the offset position of the write pointer and a frame header and frame data of a frame corresponding to the to-be-written data is greater than or equal to a total size of the circular queue;

determine, in response to the size sum is greater than or equal to the total size, that the circular queue is full; and determine, in response to the size sum is less than the total size, that the circular queue is not full.

* * * * *